(12) United States Patent
Liepe

(10) Patent No.: US 6,405,278 B1
(45) Date of Patent: Jun. 11, 2002

(54) METHOD FOR ENABLING FLASH MEMORY STORAGE PRODUCTS FOR WIRELESS COMMUNICATION

(75) Inventor: Steven F Liepe, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/315,312

(22) Filed: May 20, 1999

(51) Int. Cl.[7] .......................... G06F 12/00; G06F 13/00
(52) U.S. Cl. ..................... 711/103; 710/102; 710/129
(58) Field of Search .......................... 711/100; 710/102, 710/129; 714/764; 713/320; 455/90, 557, 556; 235/380; 439/159; 365/185.25; 361/686; 348/552

(56) References Cited

U.S. PATENT DOCUMENTS

| | | | | |
|---|---|---|---|---|
| 5,357,091 A | * | 10/1994 | Ozawa et al. ................ | 235/380 |
| 5,475,441 A | * | 12/1995 | Parulski et al. .............. | 348/552 |
| 5,680,579 A | * | 10/1997 | Young et al. ................ | 711/100 |
| 5,724,285 A | * | 3/1998 | Shinohara .............. | 365/185.25 |
| 5,732,092 A | * | 3/1998 | Shinohara ................... | 714/764 |
| 5,805,416 A | * | 9/1998 | Friend et al. ................ | 361/686 |
| 5,887,145 A | * | 3/1999 | Harari et al. ................ | 710/102 |
| 5,918,163 A | * | 6/1999 | Rossi .......................... | 455/90 |
| 5,928,347 A | * | 7/1999 | Jones .......................... | 710/129 |
| 5,996,080 A | * | 11/1999 | Silva et al. ................. | 713/320 |
| 6,174,180 B1 | * | 1/2001 | Chen .......................... | 439/159 |
| 6,195,564 B1 | * | 2/2001 | Rydbeck et al. ............ | 455/557 |

* cited by examiner

Primary Examiner—Matthew Kim
Assistant Examiner—Brian R. Peugh

(57) ABSTRACT

A method and apparatus for increasing the amount of memory available to a host device that utilizes flash memory are disclosed. In a preferred embodiment, a flash card comprising flash memory and a transmitter for transmitting data via wireless communication is utilized within a host device. Such flash card may store data in its flash memory, and may transmit data from the flash card to an extended storage device via wireless communication. In a preferred embodiment, such wireless communication is radio frequency (RF). Data transfer from the flash card to an extended storage device may be initiated by a mechanism on the flash card or on the host device. In a preferred embodiment, the flash card further comprises a receiver for receiving wireless signals. In such an embodiment, an extended storage device may initiate a data transfer by transmitting the appropriate signals to the flash card. In a preferred embodiment, an extended storage device may comprise a transmitter for further transmitting the data to another storage device(s). Such transmitter may be a more powerful transmitter than provided in the flash card, such that the extended storage device may transmit data to a more remote location. Advantageously, in a preferred embodiment an extended storage device may be a less expensive form of storage than flash memory.

20 Claims, 2 Drawing Sheets

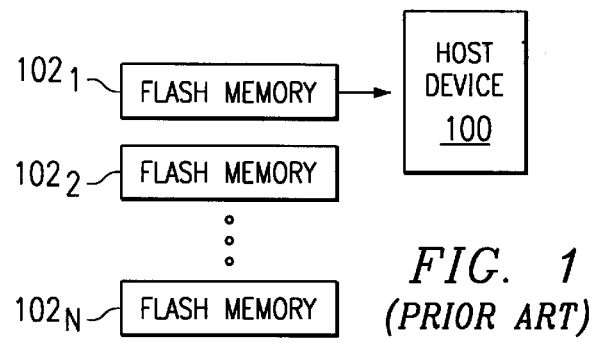
*FIG. 1*
*(PRIOR ART)*
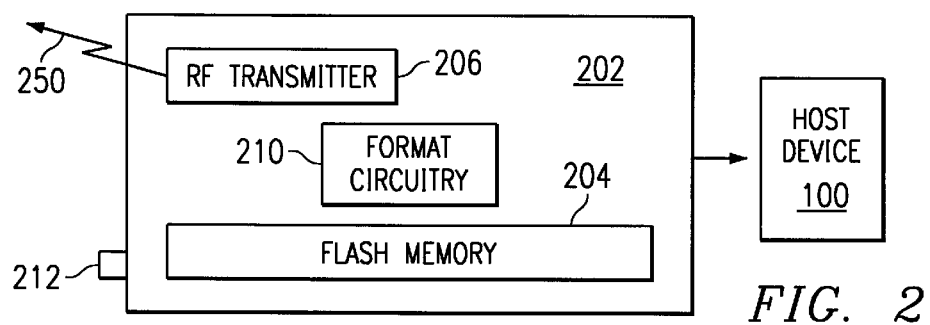
*FIG. 2*
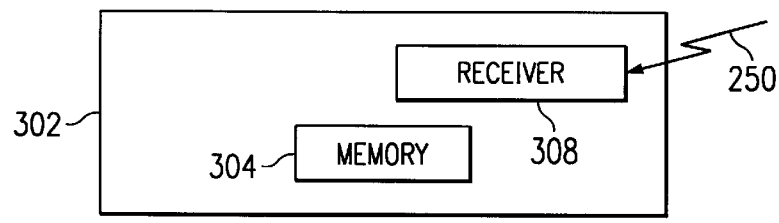
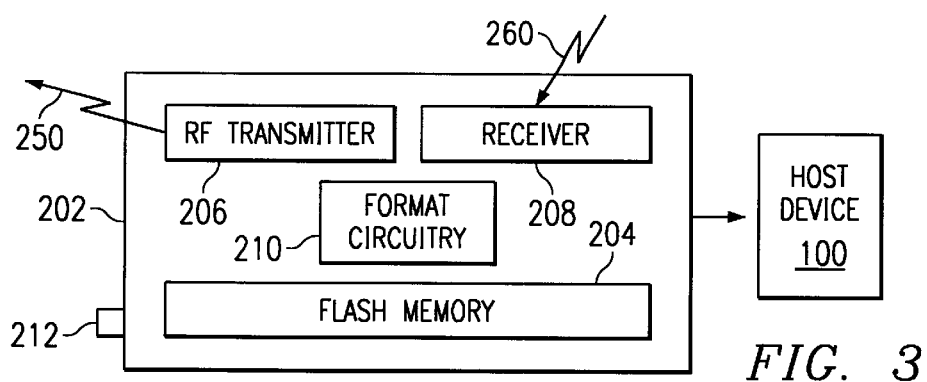
*FIG. 3*
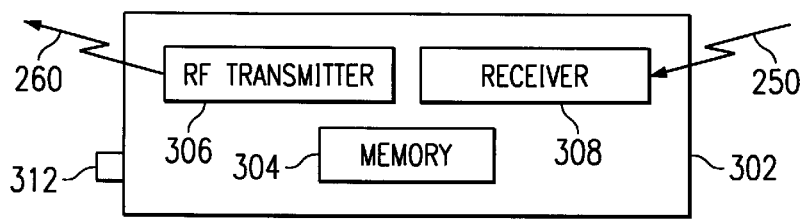

METHOD FOR ENABLING FLASH MEMORY STORAGE PRODUCTS FOR WIRELESS COMMUNICATION

BACKGROUND

Flash memory is used in many devices (referred to herein as "host devices") in the prior art, including video cameras, digital cameras, laptop computers, portable digital assistance devices (e.g., palm pilots), portable video games, portable language translators, portable digital voice recorders, handheld scanners, and other devices. With some host devices the flash memory is embedded within the device. When the flash memory reaches capacity, a user must free memory (e.g., remove data from memory) before saving additional data to it. To free memory a user may either erase data from the flash memory or somehow connect the host device to an external storage medium and download data from the flash memory to the external storage medium.

With other host devices the flash memory is provided on a separate card (i.e., a flash card) that may be removably connected to the host device and may be referred to herein as "portable flash memory." With such portable flash memory, a user may erase data from a flash card or somehow connect the flash card to an external storage medium and download data from the flash card to the external storage medium to free flash memory. Such portable flash memory may be replaced with a different flash card. Thus, when one flash card reaches capacity, a user may replace the full card with a different flash card in the host device and begin saving data to the new card.

For example, consider a prior art camera that utilizes flash cards for storing image data (i.e., photographs). Suppose a user is out in the field taking many high-resolution pictures. The flash card in the user's camera will eventually reach capacity. Typically, a 32 megabyte flash card will reach capacity after approximately 30 high-resolution photographs (i.e., image quality approaching standard film) have been stored. At that point, the user may remove the full flash card from the camera, put it into a computer (or other storage medium), dump the contents from the flash memory to the computer (or other storage medium), and then erase the flash card. Thereafter, the user may reuse the flash card in the camera. Alternatively, the user may have another flash card, and may swap this flash card for the full flash card in the camera. In the prior art, a user would typically obtain many flash cards and replace one card with another one as each card reaches capacity.

Several problems exist with the prior art methods for utilizing flash memory for storing data for host devices. First, flash cards are typically expensive. Thus, it is generally very costly for the user to have many flash cards at his disposal. For example, a 32 megabyte flash card may cost approximately $100. Other forms of memory are much less expensive. For example, a user may obtain a 1 gigabyte hard drive for approximately $100. Thus, it is costly for a user to obtain multiple flash cards to be used in a host device.

Another problem is that there are many different types of flash memory existing in the prior art and each type is not compatible with every other type of flash memory. Thus, a user is required to either utilize the type of flash memory required for his particular host device (e.g., camera) or utilize special adaptors and/or special software to allow a different type of flash memory to interface with the host device. More specifically, different types of flash memory may organize data differently within the flash memory and/or operate at different voltage levels. Continuing with the above camera example, the way images are stored in a particular type of flash memory may not be compatible with a particular reader. Also, different types of flash memory may be physically different. For example, different types of flash memory may provide different connector schemes. As a result special adaptors and/or special software may be required to interface a device with a particular type of flash memory. Such adapters and special software adds to the cost of utilizing prior art flash cards.

Yet another problem with the prior art method of utilizing portable flash memory for storing data for a host device is that a user is required to remove a flash card from the host device and replace it with another flash card. Through swapping and otherwise handling the flash cards, the flash memory of a card may be damaged. Additionally, if the flash cards are not stored safely, data encoded on the cards may be lost (e.g., by the card coming in contact with static electricity). Moreover, swapping flash cards in and out of a host device repeatedly exposes the internal portion of the host device to the environment and contributes to interconnection wear and tear, which increases the potential for damage to the host device. That is, the host device may be damaged through repeated flash connect/disconnect cycles, and exposure to dust, dirt, moisture, as well as other elements in the environment.

As a result, a need exists in the art for a method and apparatus that provide flash memory for a host device that utilizes flash memory for storing data. A further need exists in the art for a method and apparatus that provide flash memory capable of being refreshed without requiring that many separate flash cards be obtained and interchanged. Thus, a need exists for a method and apparatus that allow a single flash card to be utilized in a host device with increased storage capacity. There is a further need for a method and apparatus that provide flash memory capable of being refreshed without being required to be swapped with another flash card or otherwise removed from the host device. A still further need exists for a method and apparatus that provide flash memory for a host device and is capable of transmitting data to an extended storage device, which may allow an increased amount of storage economically.

SUMMARY OF THE INVENTION

These and other objects, features and technical advantages are achieved by a method and apparatus which utilize a flash card to provide flash memory for a host device, wherein the flash card is capable of transmitting data from the flash card to an extended storage device via wireless communication.

In a preferred embodiment, a flash card is provided that comprises a radio frequency ("RF") interface. In a preferred embodiment, such RF interface is incorporated within a flash card that can be connected to a host device, such as a video camera, digital camera, laptop computer, portable digital assistance device, portable video game, portable language translator, portable digital voice recorder, handheld scanner, or other device that utilizes flash memory. When a compatible interface is provided on an extended storage device, such as a laptop computer, a desktop computer, a hard drive, removable hard disk, ZIP drive, Jaz drive, tape drive, CD-ReWritable Disk (CD-RW), rewritable DVD (DVD+RW), or other type of storage device, the two devices can communicate electronically via radio waves. As a result, data can be transferred from the flash card to an extended storage device, and a user is not required to repeatedly swap flash cards in and out of the host device. Additionally, a user is not required to obtain multiple flash cards to use within a particular host device. Rather, a single flash card may be utilized along with an extended storage device for storing data from a host device.

In one embodiment, the flash card comprises a mechanism, such as a micro-switch, that allows a user to initiate a wireless data transmission to an extended storage device. In a preferred embodiment, such mechanism is located on the outer edge of the flash card to allow the data transmission to be initiated without requiring the card to be removed from the host device. Additionally, a mechanism can be provided on the host device for initiating a data transmission, in addition to or in place of the mechanism provided on the flash card for initiating a data transmission. In alternative embodiments, a wireless data transmission may be initiated in a variety of ways, some of which are discussed in greater detail herein.

Additionally, in a preferred embodiment the flash card further comprises a receiver for receiving wireless signals. Further, in a preferred embodiment an extended storage device is capable of transmitting wireless signals to the flash card requesting a data transmission. The flash card can receive such signals, and in response thereto, transmits data to the extended storage device via wireless communication. In this manner, the extended storage device can initiate a data transfer.

In a preferred embodiment, an extended storage device comprises a more powerful (or stronger) transmitter that is capable of further transmitting data for storage at a remote location. For example, such an extended storage device may comprise a transmitter capable of transmitting data via cellular communication to a remote storage device. Further, in a preferred embodiment, an extended storage device comprises a receiver for receiving signals from a remote location. For example, such an extended storage device may comprise a receiver capable of receiving cellular communication from a remote storage device. In such an embodiment, a remote storage device can initiate a data transfer from the flash card by transmitting such a request to the extended storage device via cellular communication (or some other long-range method of communication). In response, the extended storage device can request and receive data from the flash card and transmit such data to the remote storage device via cellular communication (or some other long-range method of communication).

In a preferred embodiment, such a flash card capable of transmitting data to an extended storage device via wireless communication is implemented in a manner compatible with currently existing host devices. That is, such a flash card is implemented in a manner that organizes data in flash memory in a compatible fashion, provides compatible connector schemes, and otherwise conforms to currently existing host devices. Accordingly, a preferred embodiment of the present invention allows current products to be "retrofitted" with an improved flash card as disclosed herein to enable wireless communication. Thus, a preferred embodiment may be readily utilized with existing host devices in place of prior art flash cards. Thus, a preferred embodiment solves the above-described capacity, size, cost, interface, and format problems of the prior art by modifying existing flash memory cards to allow wireless transmission of data from a flash card to an extended storage device while maintaining compatibility with existing or future host devices.

Additionally, in a preferred embodiment the improved flash card is capable of uploading data from an extended storage device via wireless communication. For example, such a flash card utilized within a camera may upload images via wireless communication, and the camera may then be used to view such uploaded images. Thus, the camera may serve as a remote viewer for a storage device. As a further example, such a flash card utilized within a host device for playing video games may upload video game data via wireless communication, which may then be used by the host device. Thus, games or data for a game can be stored on an external storage device and then uploaded to the flash card via wireless communication to be used by the host device.

It is therefore a technical advantage of one aspect of the present invention to provide a flash card that is capable of transmitting data to an external storage device via wireless communication. Advantageously, such a flash card allows a seemingly unlimited amount of storage by utilizing an extended storage device. Additionally, such a flash card may be relatively inexpensive because a user is not required to obtain multiple flash cards for a host device. Rather, a user can utilize the improved flash card along with an extended storage device to obtain greater storage capacity. The extended storage device can be a much less expensive form of memory than flash memory, which may reduce the overall cost to a user.

It is a further technical advantage of one aspect of the present invention to provide a flash card that eliminates the necessity of interchanging flash cards. As a result, the likelihood of the flash memory being damaged because of such interchanging is reduced. In turn, the likelihood of data loss because of the flash memory being damaged is also reduced. Moreover, the likelihood of the host device being damaged because of interchanging flash cards is reduced.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 1 shows a block diagram illustrating how portable flash memory was utilized in the prior art;

FIG. 2 shows a block diagram of a preferred embodiment of the present invention, in which flash card 202 is capable of transmitting data to extended storage device 302 via wireless communication;

FIG. 3 shows a block diagram of a preferred embodiment of the present invention, in which flash card 202 is further capable of receiving wireless signals;

DETAILED DESCRIPTION

Figure 4:
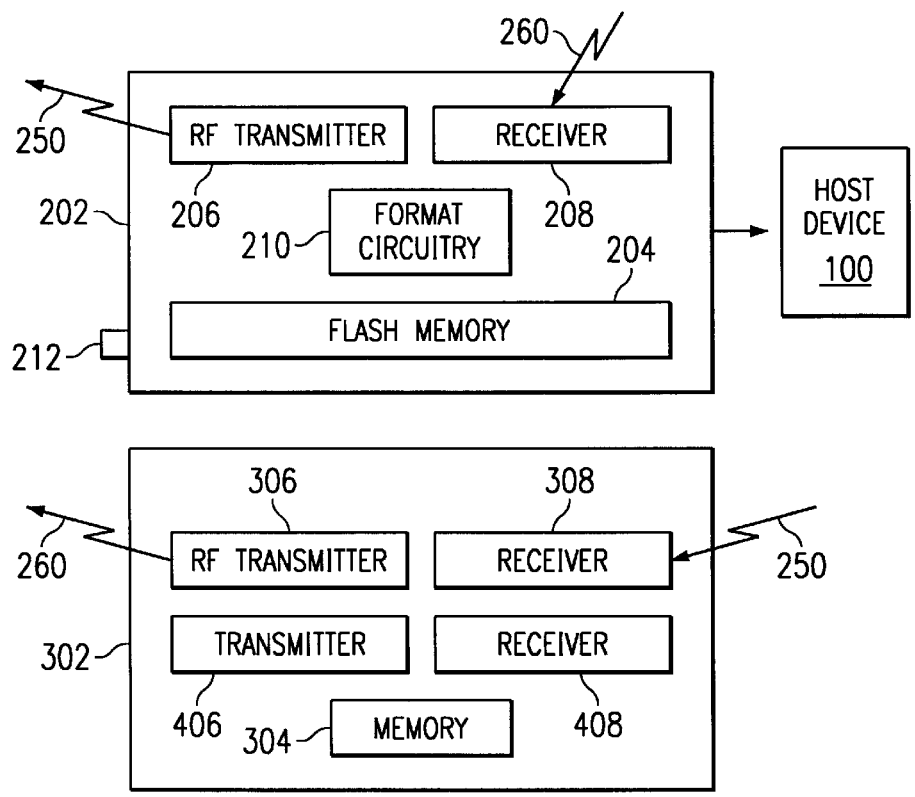
FIG. 4 shows a block diagram of a preferred embodiment of the present invention, in which extended storage device 302 is further capable of transmitting and receiving signals for long-range communication (e.g., via cellular communication)

Many host devices currently utilize flash memory to store data. The present invention may be better understood after a more detailed description of the prior art method of utilizing flash memory in a host device. Turning to FIG. 1, an example of the prior art is shown in block form. A host device 100 that utilizes flash memory is shown. Host device 100 may be a video camera, digital camera, laptop computer, portable digital assistance device (e.g., palm pilot), portable video game, portable language translator, portable digital voice recorder, handheld scanner, or some other device that stores data to flash memory.

FIG. 1 further shows flash cards $102_1$ through $102_N$, which contain flash memory. In the prior art, a user may insert flash card $102_1$ in host device 100, and host device 100 may store data in the flash memory of flash card $102_1$. When flash card $102_1$ reaches capacity (i.e., is full of data), a user may remove flash card $102_1$ from host device 100 and insert flash card $102_2$ in its place. Thereafter, a user may store data from host device 100 to flash card $102_2$. When flash card $102_2$ reaches capacity it may be replaced in a similar manner. Thus, a user may refresh the flash memory available to host device 100 by replacing each flash card as it reaches capacity with a different flash card up to the number of flash cards that a user has available (i.e., flash card $102_N$)

Turning to FIG. 2, a preferred embodiment of the present invention is shown in block form. Shown is an improved flash card 202 that comprises flash memory 204 and RF transmitter 206. Flash card 202 may be referred to herein as a "FLERF" card. In a preferred embodiment, FLERF card 202 is utilized by a host device 100. Host device 100 may be a video camera, digital camera, laptop computer, portable digital assistance device (e.g., palm pilot), portable video game, portable language translator, portable digital voice recorder, handheld scanner, or some other device that stores data to flash memory. Host device 100 may be a device currently existing in the art, or host device 100 may be a newly developed device. Accordingly, in a preferred embodiment FLERF card 202 is implemented in a manner that is compatible with existing host devices 100. That is, the connection scheme and memory organization of FLERF card 202 is compatible with existing host devices 100 that are capable of utilizing prior art flash cards 102. Thus, in a preferred embodiment, FLERF card 202 is capable of being utilized within host device 100 in place of prior art flash cards 102. with existing host devices 100 that are capable of utilizing prior art flash cards 102. Thus, in a preferred embodiment, FLERF card 202 is capable of being utilized within host device 100 in place of prior art flash cards 102.

In a preferred embodiment, RF transmitter 206 allows FLERF card 202 to transmit data from flash memory 204 to a nearby extended storage device (or "receiving device") for storage via RF 250. In a preferred embodiment, such transmission is over a short distance to an extended storage device 302 that is in close proximity to the FLERF card 202. Thus, in a preferred embodiment, the FLERF card 202 acts as an antenna for transmitting data. However, in alternative embodiments, an antenna may be provided in FLERF card 202 to allow transmission of data over a longer range via RF.

For example, an extended storage device 302 that is in near proximity to FLERF card 202 may receive data from FLERF card 202 via RF 250. Extended storage device 302 may then store the received data in memory 304. Extended storage device 302 may be any type of device capable of receiving and storing data, such as laptop computer, a desktop computer, a hard drive, removable hard disk, ZIP drive, Jaz drive, tape drive, CD-ReWritable Disk (CD-RW), rewritable DVD (DVD+RW), another FLERF card having capability of receiving data via wireless communication, or other storage device. In a preferred embodiment, extended storage device 302 is a portable device that the user of host device 100 can carry along with him/her. For example, extended storage device 302 may be a small storage device (e.g., a miniature hard drive) that a user can wear in a holster or carry in the user's pocket or purse similar to a pager. Storage device 302 may provide a large amount of memory (or storage space) relatively inexpensive to a user. For example, a user may obtain a 1 gigabyte hard drive for approximately $100, whereas a user may obtain only 32 megabytes of flash memory for approximately $100. Accordingly, a user can store much more data on an extended storage device 302 than on a flash card for less cost.

In a preferred embodiment, FLERF card 202 also comprises format circuitry 210 that is capable of interpreting and formatting the data contained on FLERF card 202 for RF transmission. As an example of how a preferred embodiment can be implemented, suppose that host device 100 is a video camera that utilizes flash memory. More specifically, video camera 100 may be an existing device that is capable of utilizing a particular type of flash card (such as prior art flash cards 102 in FIG. 1) for flash memory. A user can obtain a FLERF card 202 that is compatible with the video camera 100, and insert the FLERF card 202 in the video camera 100, rather than using a traditional flash card. The user can then store image data from the video camera 100 in the flash memory 204 of FLERF card 202. The user can also obtain an extended storage device 302, such as a miniature hard drive, that a user may have in near proximity to the FLERF card 202 (e.g., stored in the user's pocket). As the flash memory 204 reaches capacity, the user can initiate a transfer of the data from the FLERF card 202 to the nearby extended storage device 302 via RF 250.

As a result, the user is not required to interchange the FLERF card 202 with a different flash or FLERF card. Thus, the probability of the flash memory or the host device being damaged because of interchanging cards is substantially reduced. Also, in such a preferred embodiment, external storage is effectively added to the host device 100 without increasing its size. The additional storage may be easily added to a host device 100 by inserting a FLERF card 202. Additionally, a user can obtain a single FLERF card 202 for host device 100 and obtain a much less expensive form of storage (e.g., a hard drive) having greater capacity in extended storage device 302. Because, the overall cost of obtaining a single FLERF card 202 and an extended storage device 302 may be less expensive than obtaining multiple flash cards, a greater amount of data can be stored less expensively. Accordingly, a preferred embodiment reduces the overall cost incurred by the user.

FLERF card 202 preferably comprises flash memory 204, which is used by a host device 100 as flash memory of the prior art. Thus, a host device 100 stores data to flash memory 204. Accordingly, if a user is not within proximity of the extended storage device 302 to allow RF transmission, the user can store data in flash memory 204 of FLERF card 202.

Preferably, FLERF card 202 is interchangeable with prior art flash cards, thus a user can utilize FLERF card 202 as flash cards of the prior art. Thus, a user is not required to be within RF transmission range of extended storage device 302 in order to save data from host device 100. Additionally, flash memory 204 acts as a buffer during the transmission of data from the FLERF card 202 to the extended storage device 302.

As a further example, a photographer may drive his vehicle to a secluded area that has a hiking trail. The photographer may park his vehicle at the beginning of the hiking trail and leave storage device 302 in his vehicle. The photographer may carry a camera 100 having FLERF card 202 with him along the hiking trail. Thereafter, the photographer can take photographs, which are stored from camera 100 to flash memory 204 on FLERF card 202. Moreover, the photographer can transfer the image data from FLERF card 202 to the extended storage device 302 located in the photographer's vehicle via RF.

As still a further example, a photographer employed by a newspaper company in Dallas, Tex., may be on location in Dallas taking photographs with camera 100 having FLERF card 202. The photographer can take photographs, which are stored from camera 100 to flash memory 204 on FLERF card 202. Moreover, an extended storage device 302 may be located in the newspaper company's office in Dallas, Tex. Accordingly, the photographer can transfer the image data from FLERF card 202 to the extended storage device 302 in the newspaper company's Dallas office via RF.

As the previous examples illustrate, a user can initiate a transmission (or "transfer") of data from FLERF card 202 to a storage device 302 via RF 250 in a preferred embodiment. The FLERF card 202 can be implemented in a variety of different ways to allow a user to initiate such data transfer. For example, in one implementation of FLERF card 202 a microswitch 212 is provided on the outside edge of FLERF card 202, which a user can depress without being required to remove the card from host device 100. Alternatively, host device 100 can include a mechanism, such as a button, that allows a user to initiate such a data transfer. Although, at least initially, it is preferable to have a mechanism for initiating a data transfer located on the FLERF card 202 to allow compatibility of the FLERF card 202 with existing host devices 100. In another implementation, FLERF card 202 automatically initiates an attempt to transfer to the storage device when full. In yet another implementation, FLERF card 202 senses when the "flash door" is opened, either optically or mechanically, and initiates a data transfer. In still another implementation, FLERF card 202 comprises a sound sensor or sound recognition device, such that the FLERF card initiates a data transfer upon recognizing a particular sound, such as a voice command, snap of a finger or other sound. It should be understood that the FLERF card 202 may be implemented to initiate such data transfer in a variety of ways, and any such implementation is intended to be within the scope of the present invention.

In a preferred embodiment, when a data transfer is initiated, handshaking is performed between FLERF card 202 and extended storage device 302 to allow for proper data transfer between the two devices. In a preferred embodiment, such handshaking establishes the initial communication link, format compatibility of data transmission and data rate for the communication. Additionally, the handshaking can communicate frequency (band), ensure that power is sufficient to complete the transmission, and set encryption/decryption keys/modes. Also, in a preferred embodiment, the transmission/receiving frequency is a band which the transmitter and receiver "negotiate" for the best reception. Such band can be a single frequency in a band or "spread spectrum" for noise and security concerns. In a preferred embodiment, "addresses" can be utilized in which a transmitter and receiver communicate over specific addresses to avoid inadvertently transmitting data to an unintended receiver or inadvertently receiving data from an unintended transmitter. However, it should be understood that the wireless communications may be implemented in alternative embodiments utilizing various industry standard methods for such wireless communications, and any such implementation is intended to be within the scope of the present invention.

Turning to FIG. 3, a second preferred embodiment of FLERF card 202 and storage device 302 is shown. As shown, FLERF card 202 further comprises a receiver 208 that allows FLERF card 202 to receive RF transmissions. Additionally, storage device 302 further comprises a RF transmitter 306 that allows it to transmit RF signals. This embodiment allows downloads of data to be initiated by the receiving or storage device 302. The receiver initiates a transmission of data from a host device 100 to an extended storage device 302 by communicating such a desire to receiver 208 via RF. That is, storage device 302 transmits a RF signal 260 to FLERF card 202 requesting that data be transmitted from FLERF card 202 to storage device 302. Receiver 208 of FLERF card 202 receives the RF signal 260, and the FLERF card 202 recognizes the signal as a request from storage device 302 to initiate a data transfer. Accordingly, FLERF card 202 transfers data from flash memory 204 to storage device 302 via RF transmission 250.

For example, receiving device 302 may be a small storage device (e.g., a miniature hard drive) that a user may wear or carry along in the user's pocket or purse similar to a pager. Suppose that a user is a photographer and FLERF card 202 is utilized in a camera 100. A user can take photographs with camera 100, which are stored from camera 100 to flash memory 204 on FLERF card 202. Moreover, the photographer can initiate a data transfer of images from FLERF card 202 to the extended storage device 302 by activating a mechanism on extended storage device 302.

For example, as shown in FIG. 3 extended storage device 302 comprises a microswitch 312, which when depressed initiates a data transfer from FLERF card 202 to extended memory device 302. In response to the photographer depressing micro-switch 312 (or some other mechanism on extended storage device 302), extended storage device 302 utilizes RF transmitter 306 to transmit a RF signal 260 to FLERF card 202 requesting data transfer. Receiver 208 on FLERF card 202 receives the signal 260 and recognizes it as a request from extended storage device 302 to initiate data transfer. Accordingly, FLERF card 202 utilizes RF transmitter 206 to transmit data from FLERF card 202 to extended storage device 302 via RF signal 250. Receiver 308 on extended storage device 302 receives the data and stores it in memory 304.

As a further example, a photographer employed by a newspaper company in Dallas, Tex., may be on location in Dallas taking photographs with camera 100 having FLERF card 202. The photographer can take photographs, which are stored from camera 100 to flash memory 204 on FLERF card 202. Moreover, an extended storage device 302 may be located in the newspaper company's office in Dallas, Tex. Accordingly, a reporter in the Dallas office desiring the photographer's latest photographs can utilize extended storage device 302 to initiate a data transfer from FLERF card 202. That is, a reporter in the Dallas office can activate micro-switch 312 (or some other mechanism) on extended storage device 302. In response to the reporter depressing micro-switch 312 (or some other mechanism), extended storage device 302 utilizes RF transmitter 306 to transmit a RF signal 260 to FLERF card 202 requesting data transfer. Receiver 208 on FLERF card 202 receives the signal 260 and recognizes it as a request from extended storage device 302 to initiate data transfer. Accordingly, FLERF card 202 utilizes RF transmitter 206 to transmit data from FLERF card 202 to extended storage device 302 via RF signal 250. Receiver 308 on extended storage device 302 receives the data and stores it in memory 304. Thus, a reporter located in the Dallas office can utilize extended storage device 302 to initiate a data transfer from FLERF card 202 in a photographer's camera 100 on location in Dallas, and the reporter can receive the desired data from FLERF card 202 on extended storage device 302.

In a preferred embodiment, receiver 208 in FLERF card 202 can be used to receive data other than a signal(s) initiating data transfer via wireless communication 260. Through receiver 208, FLERF card 202 may receive data via wireless communication 260, which can then be stored in flash memory 204 and utilized by host device 100. For example, suppose that host device 100 is a portable video game player that is capable of reading flash memory 204 to allow a user to play a particular game. A user may store data for many games on a hard drive (or other storage device). Thereafter, the user can transmit the data for a desired game to FLERF card 202 contained in host device 100 via wireless communication (e.g., RF). FLERF card 202 receives the data for the desired game and stores it in flash memory 204. A user can then play the game on host device 100. Accordingly, a user may store data for many games in a less expensive form of memory than flash memory. Moreover, the user can change from one game to the next without being required to change flash cards in host device 100. A preferred embodiment can receive data in a similar manner for other types of devices and data, as well, such that data may be received via wireless communication by FLERF card 202 and thereafter used by host device 100. For example, image data stored on an extended storage device can be transmitted via RF to a FLERF card 202 in a camera. Thereafter, the camera can be utilized to view the received images (assuming the camera has the capability of display images stored in flash memory). Thus, in a preferred embodiment FLERF card 202 allows data to be uploaded via RF.

Turning to FIG. 4, a third preferred embodiment of FLERF card 202 and storage device 302 is shown. As shown, storage device 302 further comprises an additional transmitter 406 and receiver 408. Such additional transmitter and receiver enable extended storage device 302 to communicate with equipment located at a remote site. For example, the additional transmitter and receiver may enable extended storage device 302 to communicate via cellular technology to remote equipment. As a result, in this embodiment data can be downloaded from FLERF card 202 to a remote storage device via device 302. Thus, tele-connect capability can be added to existing host devices 100 by utilizing such a FLERF card 202 and storage device 302, as opposed to prior art flash cards.

In the embodiment illustrated in FIG. 4, a transfer of data can be initiated by equipment remote from the host device 100 containing FLERF card 202. More specifically, a transfer of data can be initiated by a user or piece of equipment located outside the range of RF signal 250. For example, suppose a photographer for a Dallas newspaper is on location in Denver, Colo., and a reporter at the newspaper office located in Dallas, Tex., desires the latest photographs from the photographer's camera. In this embodiment, the reporter may dial up to the extended storage device 302 and download the photographs to the reporter's PC via extended storage device 302. More specifically, the reporter can establish a telecommunication connection with extended storage device 302. Receiver 408 in extended storage device 302 receives telecommunication signals from the reporter's PC, and transmitter 406 utilizes cellular technology to transmit telecommunication signals to the reporter's PC.

Once the reporter has established a telecommunication connection with extended storage device 302, the reporter can request to download data from FLERF card 202. Receiver 408 receives the request and extended storage device 302 utilizes RF transmitter 306 to transmit RF signal 260 to FLERF card 202 requesting data transfer. Receiver 208 on FLERF card 202 receives the signal 260 and recognizes it as a request from extended storage device 302 to initiate data transfer. Accordingly, FLERF card 202 utilizes RF transmitter 206 to transmit data from FLERF card 202 to extended storage device 302 via RF signal 250. Receiver 308 on extended storage device 302 receives the data, and extended storage device 302 utilizes transmitter 406 to transmit the data via cellular signal to the reporter's PC in Dallas.

Additionally, extended storage device 302 comprises a mechanism for establishing a telecommunications connection with a remote location. Accordingly, a photographer in Denver may utilize transmitter 406 to establish a telecomunication connection with a PC in Dallas. Thereafter, the photographer can transmit data from FLERF card 202 and/or memory 302 to the PC via cellular signals. As the previous examples discussed in conjunction with FIG. 4 illustrate, additional transmitter 406 and receiver 408 allow data to be transmitted to a more remote location than may be accomplished with RF signals. Accordingly, the potential extended storage available to a user can be substantially increased. That is, the amount of storage available to a user via remote transmission may seemingly be unlimited. Therefore, FLERF card 202 enables a user to store large amounts of data from host device 100 without the dangers (e.g., damaging the flash memory and host device 100) and expense associated with being required to use multiple flash cards.

Figure 5:
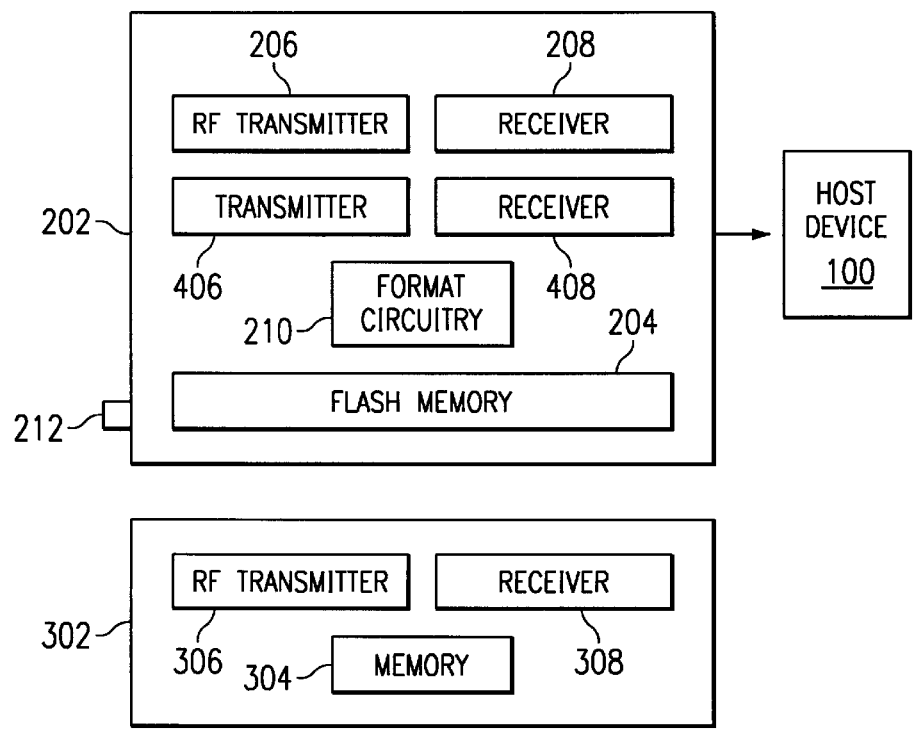
FIG. 5 shows a block diagram of an alternative embodiment of the present invention, in which flash card 202 is further capable of transmitting and receiving signals for long-range communication (e.g., via cellular communication).

Turning to FIG. 5, an alternative embodiment of FLERF card 202 is shown. As shown, FLERF card 202 further comprises an additional transmitter 406 and receiver 408. Such additional transmitter and receiver enable FLERF card 202 to communicate with equipment located at a remote site. For example, the additional transmitter and receiver may enable FLERF card 202 to communicate via cellular technology to remote equipment. As a result, in this embodiment data can be downloaded from FLERF card 202 to a remote storage device via cellular (or some other long range) transmission technology. Thus, tele-connect capability can be added to existing host devices 100 by utilizing such a FLERF card 202, as opposed to prior art flash cards.

In the embodiment illustrated in FIG. 5, a transfer of data can be initiated by equipment remote from the host device 100 containing FLERF card 202. More specifically, a transfer of data may be initiated by a user or piece of equipment located outside the range of RF signal 250. For example, suppose a photographer for a Dallas newspaper is on location in Denver, Colo., and a reporter at the newspaper office located in Dallas, Tex., desires the latest photographs from the photographer's camera. In this embodiment, the reporter can dial up to the FLERF card 202 and download the photographs to the reporter's PC. More specifically, the reporter establishes a telecommunication connection with FLERF card 202. Receiver 408 in FLERF card 202 receives telecommunication signals from the reporter's PC, and transmitter 406 utilizes cellular technology to transmit telecommunication signals to the reporter's PC.

Once the reporter has established a telecommunication connection with FLERF card 202, the reporter can request to download data from FLERF card 202. Receiver 408 receives the request and recognizes it as a request to initiate a data transfer. Accordingly, FLERF card 202 utilizes RF transmitter 406 to transmit data from FLERF card 202 via cellular signal to the reporter's PC in Dallas.

Additionally, FLERF card 202 or host device 100 can comprise a mechanism for establishing a telecommunications connection with a remote location. For example, host device 100 may have a telephone keypad or other mechanism for establishing a telecommunications connection. As a further example, FLERF card 202 can comprise a micro-switch 212 (or other mechanism) that a user can program to establish a telecommunication connection to a particular number. A user can insert the FLERF card 202 in a PC or other device and specify a telephone number for the FLERF card 202 to dial when micro-switch 212 is activated. Accordingly, a photographer in Denver may utilize transmitter 406 to establish a telecommunication connection with a PC in Dallas. That is, the photographer can program FLERF card 202 to establish telecommunications with the appropriate number for the PC in Dallas when micro-switch 212 is activated, or the photographer can otherwise utilize device 100 or some other device to specify the appropriate number for transmitter 406 to attempt to establish telecommunications. Once the telecommunication connection is established, the photographer can transmit data from FLERF card 202 to the PC via cellular signals from transmitter 406.

As the previous examples discussed in conjunction with FIG. 5 illustrate, additional transmitter 406 and receiver 408 allow data to be transmitted to a more remote location than may be accomplished with RF signals. Accordingly, the potential extended storage available to a user is substantially increased. That is, the amount of storage available to a user via remote transmission may seemingly be unlimited. Therefore, FLERF card 202 enables a user to store large amounts of data from host device 100 without the dangers (e.g., damaging the flash memory and host device 100) and expense associated with being required to use multiple flash cards.

As used herein, a "FLERF" card is a flash card that comprises a transmitter for wireless communication. Such wireless communication may be RF, cellular, or other type of wireless communication. As described herein, FLERF card 202 advantageously utilizes a potentially unlimited amount of extended storage that is available to a user. In a preferred embodiment, the power requirement for FLERF card 202 is not substantially more than that of prior art flash cards. By utilizing more current technology in FLERF card 202, the power requirement for FLERF card 202 may actually be reduced from that required for prior art flash cards.

It should be understood that extended storage device 302 may be a device now existing or later developed that further allows for storing, transmitting, displaying, or otherwise communicating and/or manipulating data received from FLERF card 202. For example, extended storage device 302 may be a palm pilot that is capable of further transmitting the received data via the Internet. Accordingly, FLERF card 202 can transmit data to an extended storage device 302, which allows a user to take advantage of other infrastructures, such as the Internet, Local Area Networks (LAN), Wide Area Networks (WAN), telecommunication networks, and other infrastructures for storing, transmitting, manipulating, and otherwise communicating data. Thus, utilizing FLERF card 202 in conjunction with an extended storage device 302 opens many possibilities to a user for storing, transmitting, and communicating data from FLERF card 202.

It should be further understood that in a preferred embodiment, data may be transferred from one FLERF to another FLERF transfer, or from one extended storage device to another extended storage device. For example, suppose a preferred embodiment of a FLERF card is utilized within a camera by person X to take pictures. Further suppose that another person (Y) desires to have some or all of the pictures that person X has taken. The image data may be transmitted from the FLERF in person X's camera to a FLERF or other storage device owned by person Y. Accordingly, person Y would not have to wait until the pictures get "developed" and sent. Rather, person Y may receive them almost instantaneously. In one embodiment a "broadcast mode" may even allow the FLERF card to transmit such image data from one FLERF to multiple extended storage devices, such as other FLERF cards. For example, one photograph may be taken of a group and transferred to all members of the group so that they all get the same photograph. In a preferred embodiment, data can be transmitted directly from one FLERF card to another FLERF card. However, in alternative embodiments, a user may have to complete a FLERF/FLERF transfer by transmitting data through other storage devices that include the needed human interface features to enable such transfer.

Many of the examples provided herein have referred to host device 100 as being a camera. It should be understood, however, that the present invention may be utilized with any type of host device 100 that is capable of storing data to flash memory. Accordingly, any host device 100 now known or later developed that is capable of storing data to flash memory is intended to be within the scope of the present invention.

It should be further understood that the present invention is not limited to portable host devices 100 that are capable of storing data to flash memory. Rather, a preferred embodiment can also be utilized within a non-portable devices. For example, suppose a nonportable sensing device is being utilized to sense hazardous materials or conditions. Rather than sending a person or some other device in to retrieve data from such a sensing device, FLERF card 202 may be utilized in the device to transmit data to a safe remote location via wireless communication (e.g., RF). Accordingly, in a preferred embodiment, a FLERF card 202 can be utilized within any type of device capable of storing data to flash memory to provide such device the ability to transmit data via wireless communication.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for storing data from a host device, said host device utilizing flash memory, comprising:

saving data from a host device to flash memory on a flash card comprising said flash memory and a transmitter for transmitting said data via wireless communication;

initiating a data transfer from said flash card to an extended storage device; and in response to said initiating, transmitting at least a portion of said data from said flash card to said extended storage device via said wireless communication.

2. The method of claim 1, wherein said wireless communication is selected from the group consisting of:

radio frequency (RF), and cellular communication.

3. The method of claim 1, wherein said host device is selected from the group consisting of:

video cameras, digital cameras, laptop computers, portable digital assistance devices, portable video games, portable language translators, portable digital voice recorders, and handheld scanners.

4. The method of claim 1, wherein said extended storage device is selected from the group consisting of:

laptop computers, desktop computers, portable hard drives, removable hard disks, ZIP drives, Jaz drives, tape drives, CD-RW, DVD+RW, and flash memory cards capable of receiving said wireless communication.

5. The method of claim 1, wherein said step of initiating a data transfer further comprises:

activating a mechanism at said flash card to initiate said data transfer.

6. The method of claim 1, wherein said step of initiating a data transfer further comprises:

receiving at said flash card a signal from said external storage device initiating said data transfer.

7. The method of claim 1, further comprising:

transmitting said data from said extended storage device to a second extended storage device.

8. The method of claim 7, wherein said data is transmitted from said extended storage device to said second storage device via communication selected from the group consisting of:

wireless communication, radio frequency (RF) communication, cellular communication, the Internet, a Local Area Network (LAN), a Wide Area Network (WAN), and telecommunication network.

9. A flash memory card for storing data and transmitting data to an extended storage device via wireless communication, said flash memory card comprising:

flash memory for storing data from a host device;

format circuitry for formatting said data for wireless transmission; and a transmitter for transmitting said data via wireless communication to an extended storage device.

10. The flash memory card of claim 9, further comprising:

means for initiating a data transfer via said wireless communication.

11. The flash memory card of claim 9, wherein said transmitter is selected from the group consisting of:

a radio frequency (RF) transmitter, and a cellular transmitter.

12. The flash memory card of claim 9, further comprising:

a receiver for receiving wireless signals.

13. The flash memory card of claim 12, wherein said flash memory card is operable to upload data from said extended storage device to said flash memory via said wireless signals.

14. The flash memory card of claim 9, wherein said flash memory card is operable to receive data from said host device and transmit said data via said wireless communication for storage in said extended storage device.

15. A method for increasing the amount of memory available to a host device that stores data to flash memory, comprising:

saving data from a host device to flash memory on a FLERF card comprising flash memory and a transmitter for transmitting said data via wireless communication;

initiating a data transfer from said flash memory on said FLERF card to an extended storage device capable of receiving data via said wireless communication; and in response to said initiating, formatting said data for transmitting from said FLERF card to said extended storage device via said wireless communication, and transmitting said formatted data from said FLERF card to said extended storage device via said wireless communication.

16. The method of claim 15, wherein said wireless communication is selected from the group consisting of:

radio frequency (RF), and cellular communication.

17. The method of claim 15, wherein said step of initiating a data transfer further comprises:

activating a mechanism at said FLERF card to initiate said data transfer.

18. The method of claim 15, wherein said step of initiating a data transfer further comprises:

receiving at said FLERF card a signal from said external storage device initiating said data transfer.

19. The method of claim 15, further comprising:

coupling said FLERF card to said host device, wherein said FLERF card is not required to be removed from said host device to refresh the flash memory of said FLERF card.

20. The method of claim 19, wherein said flash memory of said FLERF card may be refreshed by transmitting data from said flash memory of said FLERF card to an extended storage device via said wireless communication.

* * * * *